(12) United States Patent
Zhang et al.

(10) Patent No.: US 12,307,103 B2
(45) Date of Patent: May 20, 2025

(54) MEMORY ACCESS DETECTION METHOD

(71) Applicant: ALIBABA (CHINA) CO., LTD., Zhejiang Province (CN)

(72) Inventors: Shijian Zhang, Beijing (CN); Lide Duan, Sunnyvale, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 7 days.

(21) Appl. No.: 18/065,309

(22) Filed: Dec. 13, 2022

(65) Prior Publication Data
US 2024/0045599 A1 Feb. 8, 2024

(30) Foreign Application Priority Data
Aug. 3, 2022 (CN) .......................... 202210926033.3

(51) Int. Cl.
*G06F 3/06* (2006.01)
(52) U.S. Cl.
CPC .......... *G06F 3/0622* (2013.01); *G06F 3/0631* (2013.01); *G06F 3/0653* (2013.01); *G06F 3/0671* (2013.01)
(58) Field of Classification Search
CPC .... G06F 3/0622; G06F 3/0631; G06F 3/0653; G06F 3/0671; G06F 21/52; G06F 21/566; G06F 12/1441
See application file for complete search history.

(56) References Cited

U.S. PATENT DOCUMENTS

| | | | |
|---|---|---|---|
| 7,487,327 B1* | 2/2009 | Chang ................. | G06F 12/1081 710/3 |
| 10,223,254 B1* | 3/2019 | Frolikov ............... | G06F 3/0608 |
| 2010/0235598 A1* | 9/2010 | Bouvier .............. | G06F 12/1483 712/30 |
| 2022/0027520 A1* | 1/2022 | Li ....................... | G06F 12/1425 |
| 2023/0237184 A1* | 7/2023 | Shin .................... | G06F 21/6218 726/26 |

OTHER PUBLICATIONS

Kostya Serebryyany et al., Memory Tagging: how it improves C/C++ memory safety Compiler perspective, Oct. 2018.
Wei Song et al., Towards General Purpose Tagged Memory, Jun. 30, 2015.

(Continued)

*Primary Examiner* — Khoa D Doan
(74) *Attorney, Agent, or Firm* — WPAT, P.C.; Anthony King

(57) ABSTRACT

The present application discloses a processing unit and an access detection method thereof. The processing unit includes an execution circuit. The execution circuit connects to a memory and is configured to: execute an access request, wherein the access request is for accessing at least one part of a first physical memory section corresponding to a first access base address; determine whether a first tag of the access request is equal to a second tag corresponding to the first memory base address and whether the at least one part of the first physical memory section matches a first legal access section corresponding to the first memory base address; and determine whether to send an alert message according to the determination result.

13 Claims, 28 Drawing Sheets

(56) References Cited

OTHER PUBLICATIONS

Mengyu Ma et al., Dam: A Practical Scheme to Mitigate Data-oriented Attacks with Tagged Memory based on Hardware, Dec. 2019.
Nickolai Zeldovich et al., Hardware Enforcement of Application Security Policies Using Tagged Memory, Dec. 2008.
Arm, Arm® Architecture Reference Manual Armv8, for Armv8-A architecture profile, pp. D6-2689 to D6-2698.
Tao Lu, A Survey on RISC-V Security: Hardware and Architecture, Jul. 9, 2021.
Kostya Serebryyany, Arm Memory Tagging Extension and How It Improves C/C++ Memory Safety, 2019.

* cited by examiner

| T11 | B11 | D11 | |
|---|---|---|---|
| ... | ... | ... | |
| 0xC | 0x0 | 0x00000000_00000000_00000000_00000000 | 0x81000020 |
| 0xC | 0xf | 0x00000000_00000000_00000000_00000000 | 0x81000010 |
| ... | ... | ... | 0x81000000 |

FIG. 2C

| T11 | B11 | D11 | |
|---|---|---|---|
| ⋮ | ⋮ | ⋮ | |
| 0xC | 0x0 | 0x00000000_00000000_00000000_00000000 | 0x81000020 |
| 0xC | 0xf | 0x4b000000_00000000_00000000_00000000 | 0x81000010 |
| ⋮ | ⋮ | ⋮ | 0x81000000 |

FIG. 2E

| T11 | B11 | D11 | |
|---|---|---|---|
| ⋮ | ⋮ | ⋮ | |
| 0xC | 0x0 | 0x00000000_00000000_00000000_00000049 | 0x81000020 |
| 0xC | 0xf | 0x4b000000_00000000_00000000_00000000 | 0x81000010 |
| ⋮ | ⋮ | ⋮ | 0x81000000 |

uint32_t *ptr=new uint32_t[3];

| | 0x81000010 | 0x81000008 | 0x81000000 | |
|---|---|---|---|---|
| D21 | ... | 0x00000000_00000000 | 0x00000000_00000000 | ... |
| B21 | ... | 0x3 | 0x7 | ... |
| T21 | ... | 0xD | 0xD | ... |

FIG. 3C

| T21 | B21 | D21 | |
|---|---|---|---|
| ... | ... | ... | 0x81000010 |
| 0xD | 0x3 | 0x00000000_00000000 | 0x81000008 |
| 0xD | 0x7 | 0x00001a1a_00000000 | 0x81000000 |
| ... | ... | ... | |

| | T21 | B21 | D21 | |
|---|---|---|---|---|
| ... | ... | ... | ... | |
| 0xD | 0x3 | 0x00000000_00002b2b | | 0x81000010 |
| 0xD | 0x7 | 0x00001a1a_00000000 | | 0x81000008 |
| ... | ... | ... | | 0x81000000 |

PG21

...
...
...
ptr[3]=0x3c3c;
...
...
...
...
...
...
...

```
...
...
...
char *ptr=new char[17];
...
...
...
...
...
...
...
```

FIG. 4B

| T31 | B31 | D31 | |
|---|---|---|---|
| ⋮ | ⋮ | ⋮ | |
| 0xC | 0x1 | 0x00000000_00000000_00000000_00000000 | 0x81000020 |
| 0xC | 0xffff | 0x00000000_00000000_00000000_00000000 | 0x81000010 |
| ⋮ | ⋮ | ⋮ | 0x81000000 |

FIG. 4C

|  | T31 | B31 | D31 |  |
|---|---|---|---|---|
|  | ⋮ | ⋮ | ⋮ |  |
| 0x81000020 | 0xC | 0x1 | 0x00000000_00000000_00000000_00000000 |  |
| 0x81000010 | 0xC | 0xffff | 0x4b000000_00000000_00000000_00000000 |  |
|  | ⋮ | ⋮ | ⋮ |  |

FIG. 4E

| T31 | B31 | D31 | |
|---|---|---|---|
| ⋮ | ⋮ | ⋮ | |
| 0xC | 0x1 | 0x00000000_00000000_00000000_00000049 | 0x81000020 |
| 0xC | 0xffff | 0x4b000000_00000000_00000000_00000000 | 0x81000010 |
| ⋮ | ⋮ | ⋮ | 0x81000000 |

FIG. 4G

MEMORY ACCESS DETECTION METHOD

CROSS-REFERENCE TO RELATED APPLICATIONS

This application claims priority to China Application Serial Number 202210926033.3, filed on Aug. 3, 2022, which is incorporated by reference in its entirety.

TECHNICAL FIELD

The present application relates to a processing unit for a memory and an access detection method thereof, and more particularly, to a processing unit for executing a memory extension tagging mechanism for defending against buffer overflows, and a method thereof.

BACKGROUND

A buffer overflow is a flaw in program designs, and is frequently used as a means for attack by hackers. Common buffer overflows include stack buffer overflows and heap buffer overflows. Stack buffer overflows are often used to execute malicious software, and heap buffer overflows are often used in sensitive data theft. Therefore, there is a need to develop an access detection and alert method so as to prevent hackers from using buffer overflows for attacks.

SUMMARY

One embodiment of the present application relate to an access detection method for a memory. The access detection method includes: executing an access request, wherein the access request is for accessing at least one part of a first physical memory section corresponding to a first access base address; determining whether a first tag of the access request is equal to a second tag corresponding to the first memory base address and whether the at least one part of the first physical memory section matches a first legal access section corresponding to the first memory base address; and determining whether to send an alert message according to the determination result.

One embodiment of the present application relates to an access detection method for a memory. The access detection method includes: allocating at least one first physical memory section corresponding to at least one first memory base address based on a memory allocation instruction; determining at least one first tag corresponding to the at least one first memory base address; and determining at least one first legal access section corresponding to the at least one first memory base address based on a parameter of the memory allocation instruction.

Another embodiment of the present application relates to a processing unit. The processing unit includes: an execution circuit, electrically connecting to a memory, and is configured to perform the foregoing access detection method.

The processing unit and the access detection method thereof of the present application are capable of simultaneously using a tag corresponding to a physical memory section and legal access section information to detect whether an access operation to the physical memory section is legal, and to send an alert message when necessary.

BRIEF DESCRIPTION OF THE DRAWINGS

Aspects of the present disclosure can be better understood by reading the following embodiments in combination with the accompanying drawings below. It should be noted that, according to standard practice in industry, the various structures in the drawings are not drawn to scales. In fact, for description clarity, the sizes of the various structures may be increased or reduced as desired.

FIG. 2A to FIG. 2H are schematic diagrams of some examples of access detection.

FIG. 3A to FIG. 3H are schematic diagrams of some examples of access detection.

FIG. 4A to FIG. 4H are schematic diagrams of some examples of access detection.

DETAILED DESCRIPTION

Figure 1A:
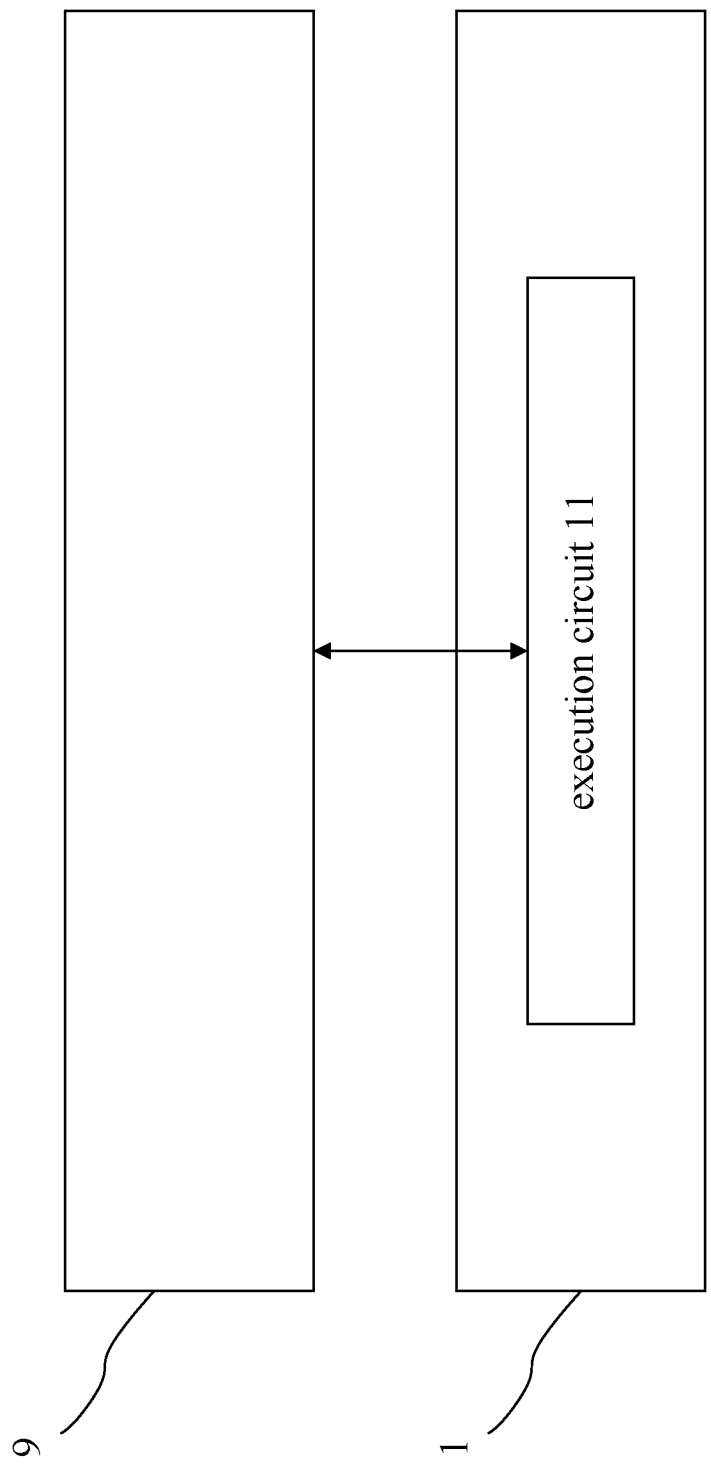
FIG. 1A is a block diagram of a processing unit according to an embodiment.

The disclosure below provides various different embodiments or examples of different components used to implement the subject matter of the disclosure. Specific examples of components and configurations are given in the description below to simplify the present disclosure. However, such descriptions are merely examples and are not intended to be restrictive. For example, in the description below, a first component formed on or above a second component may include an embodiment in which the first component and the second component are formed in a direct contact manner, and may further include an embodiment in which an additional component is formed between the first component and the second component in a way that the first component and the second component are in indirect contact. Moreover, reference numerals and/or alphabetical symbols may be repeated in the various embodiments of the present disclosure. Such repetition is for the sake of brevity and clarity and does not indicate relations of the various embodiments and/or configurations discussed herein.

Moreover, for better description, for example, relative spatial terms such as "below", "beneath", "under", "above", "on top of" and "over" and the like may be used to describe a relation of one element or component with respect to another element or component illustrated in the drawings. In addition to the orientation depicted in the drawings, the relative spatial terms are intended to cover different orientations of a device in use or in operation. An apparatus may be orientated by other means (rotated by 90 degrees or having another orientation), and descriptive relative spatial terms used herein may also be similarly and correspondingly interpreted.

For example, terms herein such as "first", "second" and "third" are used to describe various elements, components, areas, layers and/or sections, it should be noted that these elements, components, areas, layers and/or sections are not to be limited by such terms. Such terms are used to differentiate one element, component, area, layer or section from another. For example, the terms "first", "second" and "third" used herein do not imply a sequence or order, unless otherwise specified in the contents of the background.

The singular form "a", "one" and "the" may include the plural form, unless otherwise specified in the context. The term "connect/couple" and its derivatives are used to describe structural relations of parts herein. The term "connect/couple" may be used to describe that two or more elements are in direct physical or electrical contact with each other. The term "connect/couple" may be used to indicate that two or more elements are in direct or indirect (with an intermediate element in between) physical or electrical contact with each other, and/or these two or more elements coordinate or interact with each other.

Figure 1B:
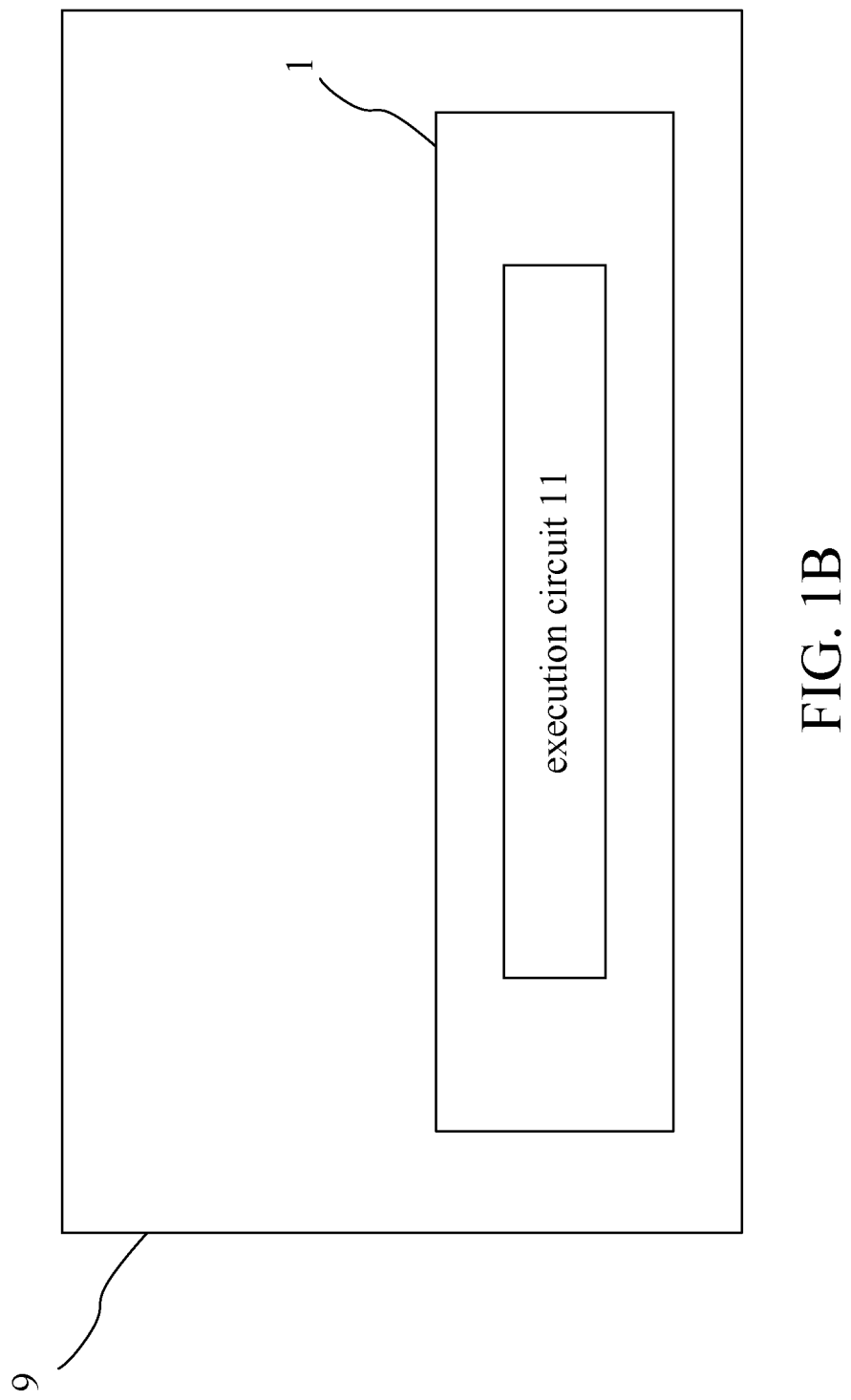
FIG. 1B is a block diagram of a processing unit according to an embodiment.

FIG. 1A and FIG. 1B show block diagrams of a processing unit 1 according to an embodiment of the present application. The processing unit 1 includes an execution circuit 11. The execution circuit 11 couples/electrically connects to a memory unit (not shown) of a memory 9. As shown in FIG. 1A, in some embodiments, the processing unit 1 is a control component independent from the memory 9. As shown in FIG. 1B in some embodiments, the processing unit 1 is a micro control component of the memory 9. Data and signals are transmitted among the components through electrical connections. In some embodiments, the memory 9 includes a memory unit for tagging extension. Associated details and operations are to be further given in the description below.

In some embodiments, the execution circuit 11 loads and executes a program. Next, during the execution of the program, the execution circuit 11 executes an access request. The access request is for accessing at least a part of a physical memory section corresponding to a memory base address. The execution circuit 11 determines: (1) whether a first tag of the access request is equal to a second tag corresponding to the memory base address; and (2) whether the at least one part of the physical memory section matches a legal access section corresponding to the memory base address, so as to obtain a determination result. The execution circuit 11 determines whether to send an alert message (equivalent to an exception report) according to the determination result.

In some embodiments, when the execution circuit 11 determines that the first tag is not equal to the second tag or the at least one part of the physical memory section does not match the legal access section, the execution circuit 11 determines to send the alert message. In some embodiments, when the execution circuit 11 determines that the first tag is equal to the second tag and the at least one part of the physical memory section matches the legal access section, the execution circuit 11 determines not to send the alert message. To better understand the technical features of the present application, examples are described below.

Figure 2A:
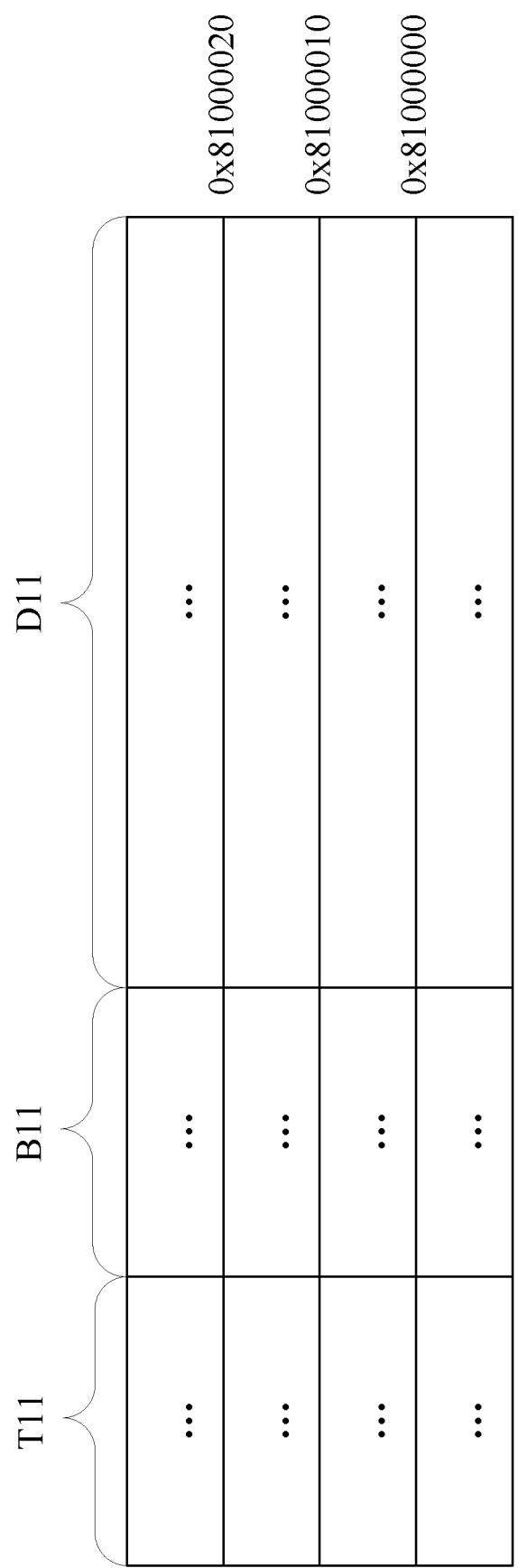

FIG. 2A to FIG. 2H show schematic diagrams of some examples of access detection of the present application. It should be noted that, in some embodiments, as shown in FIG. 2A, the memory 9 can be divided into three areas T11, B11 and D11, wherein T11 is for storing tag information, B11 is for storing legal access section information, and D11 is for storing data of physical memory sections. One data entry of the area D11 corresponds to one legal access section information entry of the area B11 and one tag entry of the area T11. When a size of each data entry of the area D11 is M bytes, a size of each legal access section information entry of the area B11 is $\log_2 M$ bits, and a size of each tag entry of the area T11 is N bits. For better understanding, in these embodiments, the size of each tag entry in the area T11 is 4 bits, the size of each data entry in the area D11 is 16 bytes, the size of each legal access section information entry in the area B11 is 4 bits, and data is primarily expressed in a hexadecimal form. However, the above examples are not to be construed as limitations to the implementation forms of the present application.

Figure 2B:
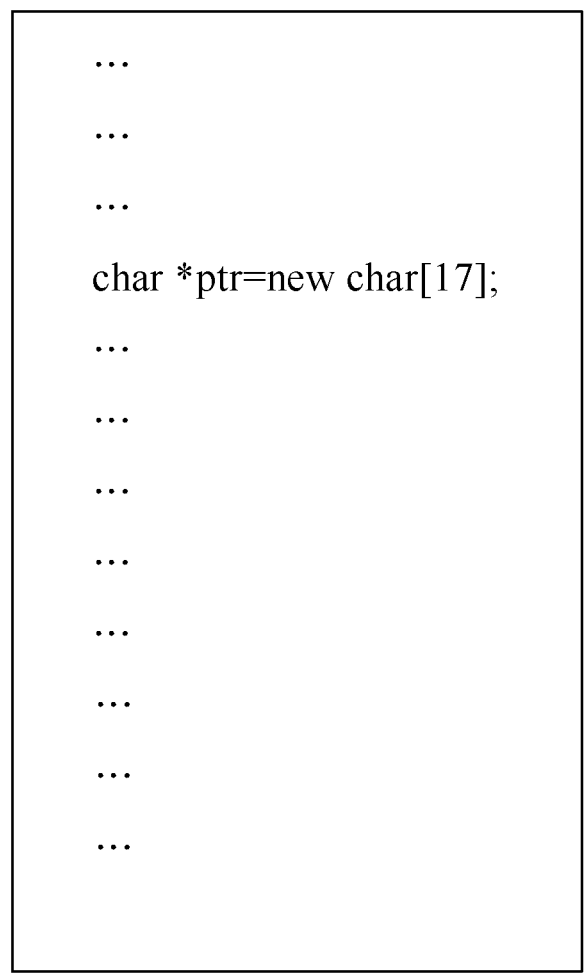

First of all, as shown in FIG. 2B and FIG. 2C, the execution unit 11 executes a program PG11. Upon processing a program code "char*ptr=new char[17];", the execution unit 11 executes a memory allocation instruction malloc (0x11), so as to allocate physical memory sections 0x81000000 to 0x8100000f corresponding to a memory base address 0x81000000 and physical memory sections 0x810000010 to 0x8100001f corresponding to a memory base address 0x810000010. Next, the execution unit 11: (1) determines a tag 0xC corresponding to the memory base addresses 0x81000000 and 0x81000010; and (2) determines a legal access section corresponding to the memory base addresses 0x81000000 and 0x81000010 based on a size parameter 0x11 of the memory allocation instruction malloc (0x11). In these embodiments, the legal access section is a legal access address section.

Further, the legal access section corresponding to the memory base address is determined as below: when the size parameter of the memory allocation instruction is greater than M, the execution circuit 11 determines a value of the last legal access address section to be ((size1% M)−1), and a value of the remaining legal access address section to be (M−1); when the size parameter of the memory allocation instruction is less than or equal to M, the execution circuit 11 determines that the value of the legal access address section to be (size1−1). In the above, "size1" represents the size parameter of the memory allocation instruction, and "M" represents the number of bytes of the size of each data entry in the area D11. In these embodiments, the size parameter is 0x11 and M is 0x10, so the execution circuit 11 determines the value of the last legal access address section to be ((0x11%0x10)−0x01)=0x0, and the value of the remaining legal access address section to be 0xf; that is, the value of the legal access address section corresponding to the memory base address 0x81000010 is 0x0, and the value of the legal access address section corresponding to the memory base address 0x81000000 is 0xf.

Figure 2D:
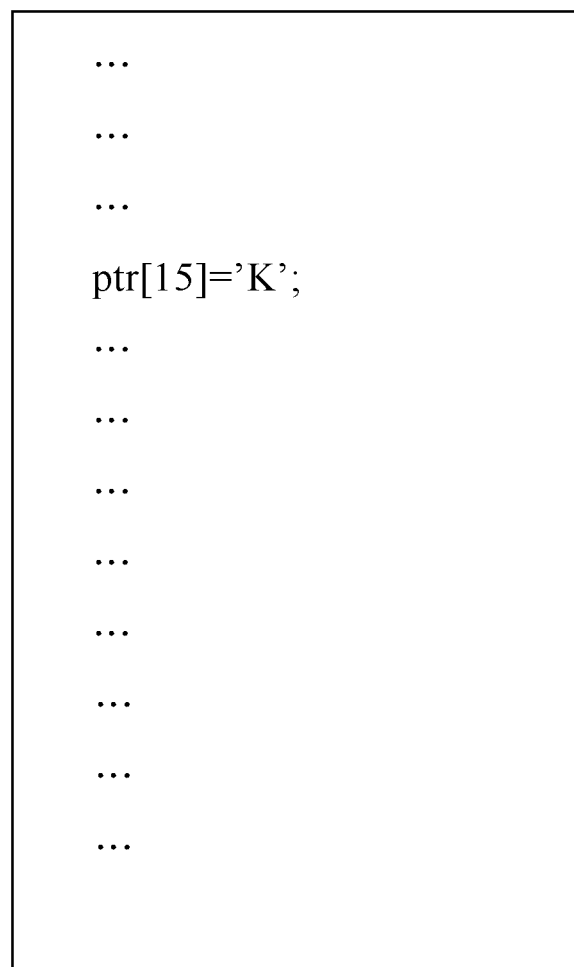

Next, as shown in FIG. 2D and FIG. 2E, when the execution circuit 11 processes a program code "ptr[15]='K';" the execution circuit 11 executes an access request (0x0c000000_8100000f, 0x1), and writes the value "K" (the hexadecimal value corresponding to "K" of the ASCII code is 0x4b) to the address 0x8100000f of the memory 9. In the above, the memory base address corresponding to the access request (0x0c000000_8100000f, 0x1) is 0x81000000, the corresponding address offset is 0x8100000f-0x81000000=0xf, the tag is 0x0c, and the size parameter is 0x1.

To write the value "K" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0c of the access request (0x0c000000_8100000f, 0x1) is identical to the tag corresponding to the memory base address 0x81000000. In these embodiments, the tag corresponding to the memory base address 0x81000000 is 0x0c, and so the execution circuit 11 determines that the tag of the access request (0x0c000000_8100000f, 0x1) is identical to the tag corresponding to the memory base address 0x81000000.

Moreover, the execution circuit 11 determines whether the part of the physical memory section to be accessed by the access request is located in a legal access address section corresponding to the memory base address. Further, the step of the above determining primarily includes: when (offset+ size2−1)% M is less than or equal to B, the execution circuit 11 determines that the part of the physical memory section is located in the legal access address section; when (offset+size2−1)% M is greater than B, the execution circuit 11 determines that the part of the physical memory section is not located in the legal access address section. In the above, "offset" represents the address offset, "size2" represents a size parameter of the access request, and "B" represents a value of the legal access address section.

In some embodiments, because (0xf+0x1−1)%16 is less than 0xf, the execution circuit 11 determines that the part 0x8100000f of the physical memory section 0x81000000 to 0x8100000f to be accessed by the access request (0x0c000000_8100000f, 0x1) is located in a legal access address section corresponding to the memory base address 0x81000000.

Accordingly, since the execution circuit 11 determines that: (1) the tag of the access request is equal to the tag corresponding to the memory base address; and (2) the part of the physical memory section matches the legal access section corresponding to the memory base address, the execution circuit 11 determines not to send an alert message (that is, not to issue an exception report), and write the value "K" to the corresponding address.

Figure 2F:
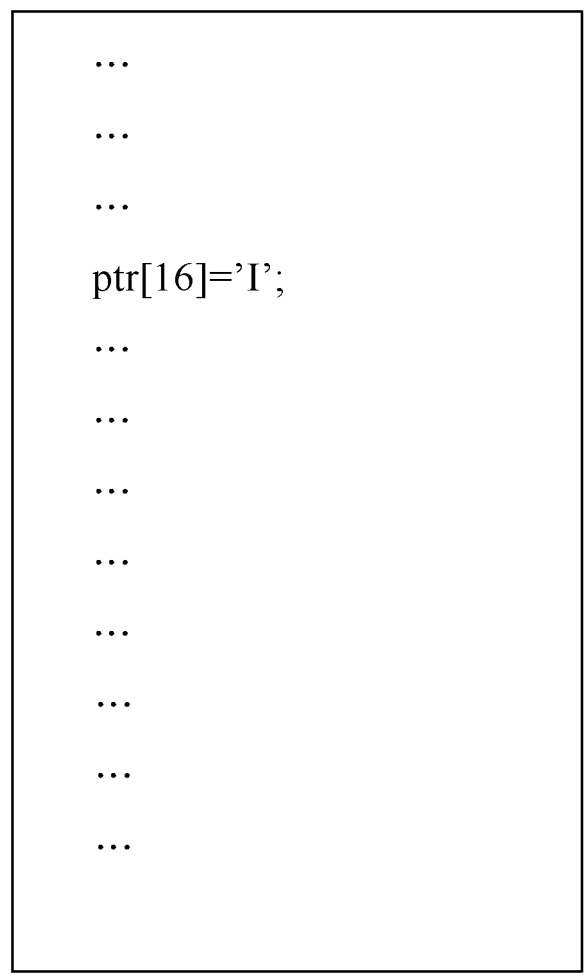

Next, as shown in FIG. 2F and FIG. 2G, when the execution circuit 11 processes a program code "ptr[16]='I';" the execution unit 11 executes an access request (0x0c000000_81000010, 0x1) with respect to the address and size of the memory 9, and writes the value "I" (the hexadecimal value corresponding to "I" of the ASCII code is 0x49) to the address 0x81000010 of the memory 9. In the above, the memory base address corresponding to the access request (0x0c000000_81000010, 0x1) is 0x81000010, the corresponding address offset is 0x81000010-0x8100010=0x0, the tag is 0x0c, and the size parameter is 0x1.

To write the value "1" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0c of the access request (0x0c000000_81000010, 0x1) is identical to the tag corresponding to the memory base address 0x81000010. In these embodiments, the tag corresponding to the memory base address 0x81000010 is 0x0c, and so the execution circuit 11 determines that the tag of the access request (0x0c000010_81000010, 0x1) is identical to the tag corresponding to the memory base address 0x81000010.

Moreover, the execution circuit 11 determines whether the part of the physical memory section to be accessed by the access request is located in a legal access address section corresponding to the memory base address. In some embodiments, because (0x0+0x1−1)%16 is equal to 0x0, the execution circuit 11 determines whether the part 0x81000010 of the physical memory section 0x81000010 to 0x8100001f to be accessed by the access request (0x0c000000_81000010, 0x1) is located in a legal access address section corresponding to the memory base address 0x81000010.

Accordingly, since the execution circuit 11 determines that: (1) the tag of the access request is equal to the tag corresponding to the memory base address; and (2) the part of the physical memory section matches the legal access section corresponding to the memory base address, the execution circuit 11 determines not to send an alert message (that is, not to issue an exception report), and write the value "1" to the corresponding address.

Figure 2H:
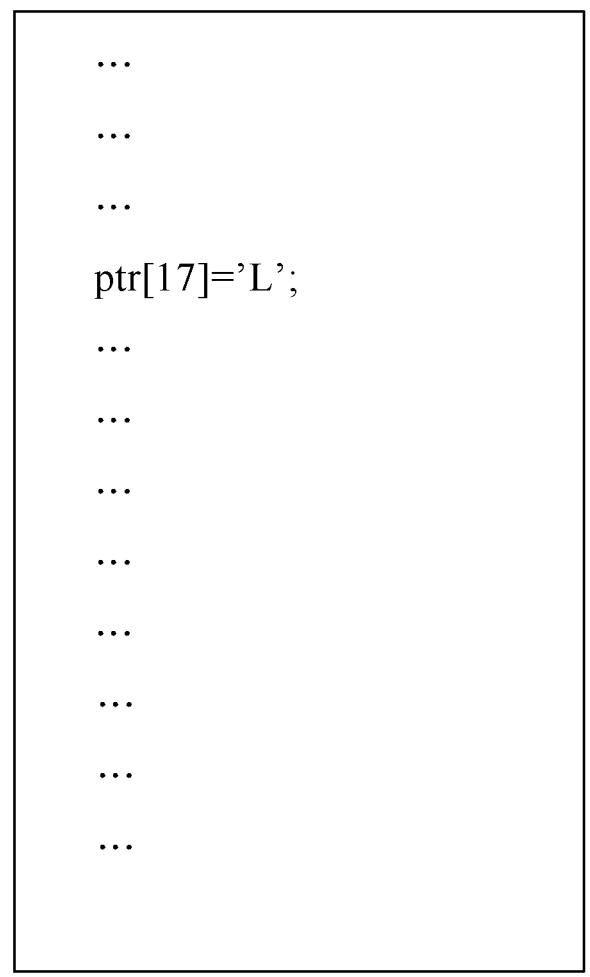

Next, as shown in FIG. 2H, when the execution circuit 11 processes a program code "ptr[17]='L';" the execution unit 11 executes an access request (0x0c000000_81000011, 0x1) with respect to the address and size of the memory 9, and writes the value "L" (the hexadecimal value corresponding to "L" of the ASCII code is 0x4c) to the address 0x810000011 of the memory 9. In the above, the memory base address corresponding to the access request (0x0c000000_81000011, 0x1) is 0x81000010, the corresponding address offset is 0x81000011-0x8100010=0x1, the tag is 0x0c, and the size parameter is 0x1.

To write the value "L" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0c of the access request (0x0c000000_81000011, 0x1) is identical to the tag corresponding to the memory base address 0x81000010. In these embodiments, the tag corresponding to the memory base address 0x81000010 is 0x0c, and so the execution circuit 11 determines that the tag of the access request (0x0c000010_81000011, 0x1) is identical to the tag corresponding to the memory base address 0x81000010.

Moreover, the execution circuit 11 determines whether the part of the physical memory section to be accessed by the access request is located in a legal access address section corresponding to the memory base address. In these embodiments, because (0x1+0x1−1)%16 is greater than 0x0, the execution circuit 11 determines that the part 0x81000011 of the physical memory section 0x81000010 to 0x8100001f to be accessed by the access request (0x0c000000_81000011, 0x1) is not located in a legal access address section corresponding to the memory base address 0x81000010.

Accordingly, since the execution circuit 11 determines that the part of the physical memory section does not match the legal access section corresponding to the memory base address, the execution circuit 11 determines to send an alert message (that is, to issue an exception report), and does not write the value "L" to the corresponding address.

Figure 3A:
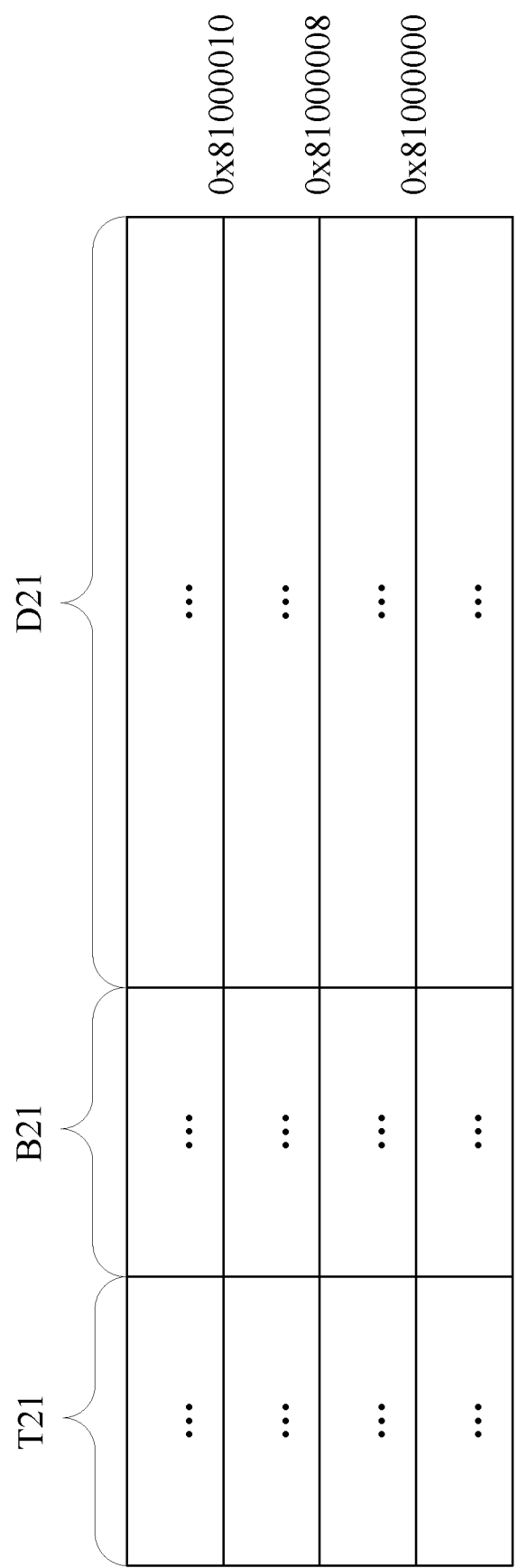

FIG. 3A to FIG. 3H show schematic diagrams of some examples of access detection of the present application. It should be noted that, in some embodiments, as shown in FIG. 3A, the memory 9 can be divided into three areas T21, B21 and D21, wherein T21 is for storing tag information, B21 is for storing legal access section information, and D21 is for storing data of physical memory sections. One data entry of the area D21 corresponds to one legal access section information entry of the area B21 and one tag entry of the area T21. When the size of each data entry of the area D21 is M bytes, the size of each legal access section information entry of the area B21 is $\log_2 M$ bits, and the size of each tag entry of the area T21 is N bits. For better understanding, in these embodiments, the size of each tag entry in the area T21 is 4 bits, the size of each data entry in the area D21 is 8 bytes, the size of each legal access section information entry in the area B21 is 3 bits, and data is primarily expressed in a hexadecimal form. However, the above examples are not to be construed as limitations to the implementation forms of the present application.

Figure 3B:
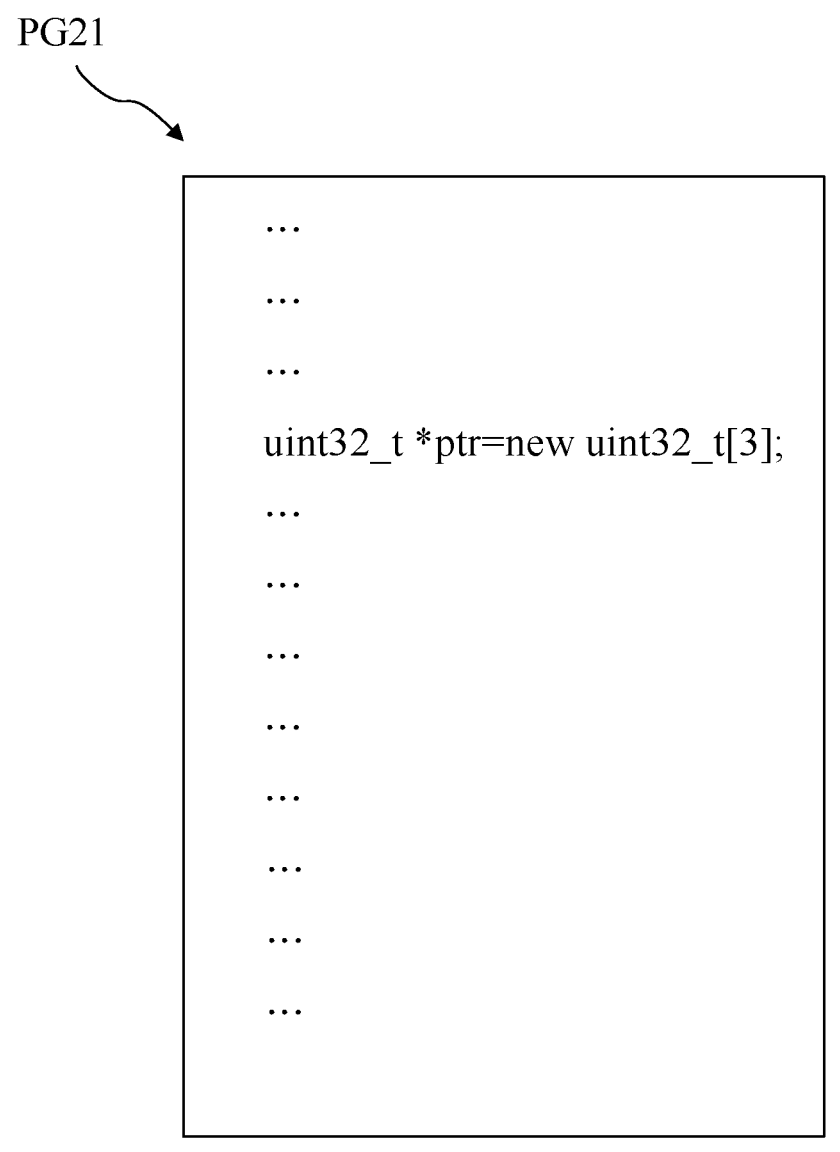

First of all, as shown in FIG. 3B and FIG. 3C, the execution unit 11 executes a program PG21. Upon processing a program code "uint32_t*ptr=new uint32_t[3];", the execution unit 11 executes a memory allocation instruction malloc (0xc), so as to allocate a physical memory section 0x81000000 to 0x81000007 corresponding to a memory base address 0x81000000 and a physical memory section 0x810000008 to 0x8100000f corresponding to a memory base address 0x810000008. Next, the execution unit 11: (1) determines a tag 0xD corresponding to the memory base addresses 0x81000000 and 0x81000008; and (2) determines a legal access section corresponding to the memory base addresses 0x81000000 and 0x81000008 based on a size parameter 0xc of the memory allocation instruction malloc (0xc). In these embodiments, the legal access section is a legal access address section.

Further, the legal access section corresponding to the memory base address is determined as below: when the size parameter of the memory allocation instruction is greater than M, the execution circuit 11 determines a value of the last legal access address section to be ((size1% M)−1), and a value of the remaining legal access address section to be (M−1); when the size parameter of the memory allocation instruction is less than or equal to M, the execution circuit 11 determines the value of the legal access address section to be (size1−1). In the above, "size1" represents the size parameter of the memory allocation instruction, and "M" represents the number of bytes of the size of each data entry in the area D21. In these embodiments, the size parameter is 0xc and M is 0x08, and so the execution circuit 11 determines the value of the last legal access address section to be ((0xc %0x08)−0x01)=0x3, and the value of the remaining legal access address section to be 0x7; that is, the value of the legal access address section corresponding to the memory base address 0x81000008 is 0x3, and the value of the legal access address section corresponding to the memory base address 0x81000000 is 0x7.

Figure 3D:

Next, as shown in FIG. 3D and FIG. 3E, when the execution circuit 11 processes a program code "ptr[1]=0x1a1a;" the execution circuit 11 executes an access request (0x0d000000_81000004, 0x4), and writes the value "0x1a1a" to the addresses 0x81000004 to 0x81000005 of the memory 9. In the above, the memory base address corresponding to the access request (0x0d00000_81000004, 0x4) is 0x81000000, the corresponding address offset is 0x81000004-0x8100000=0x4, the tag is 0x0d, and the size parameter is 0x4.

To write the value "0x1a1a" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0d of the access request (0x0d00000_81000004, 0x4) is identical to the tag corresponding to the memory base address 0x81000000. In these embodiments, the tag corresponding to the memory base address 0x81000000 is 0x0d, and so the execution circuit 11 determines that the tag of the access request (0x0d000000_81000004, 0x4) is identical to the tag corresponding to the memory base address 0x81000000.

Moreover, the execution circuit 11 determines whether the part of the physical memory section to be accessed by the access request is located in a legal access address section corresponding to the memory base address. Further, the step of the above determining primarily includes: when (offset+size2−1)% M is less than or equal to B, the execution circuit 11 determines that the part of the physical memory section is located in the legal access address section; when (offset+size2−1)% M is greater than B, the execution circuit 11 determines that the part of the physical memory section is not located in the legal access address section. In the above, "offset" represents the address offset, "size2" represents a size parameter of the access request, and "B" represents a value of the legal access address section.

In some embodiments, because (0x4+0x4−1)%8 is less than 0x7, the execution circuit 11 determines whether the part 0x81000004 to 0x81000005 of the physical memory section 0x81000000 to 0x81000007 to be accessed by the access request (0x0d000000_81000004, 0x4) is located in a legal access address section corresponding to the memory base address 0x81000000.

Accordingly, since the execution circuit 11 determines that: (1) the tag of the access request is equal to the tag corresponding to the memory base address; and (2) the part of the physical memory section matches the legal access section corresponding to the memory base address, the execution circuit 11 determines not to send an alert message (that is, not to issue an exception report), and write the value "0x1a1a" to the corresponding address.

Figure 3F:
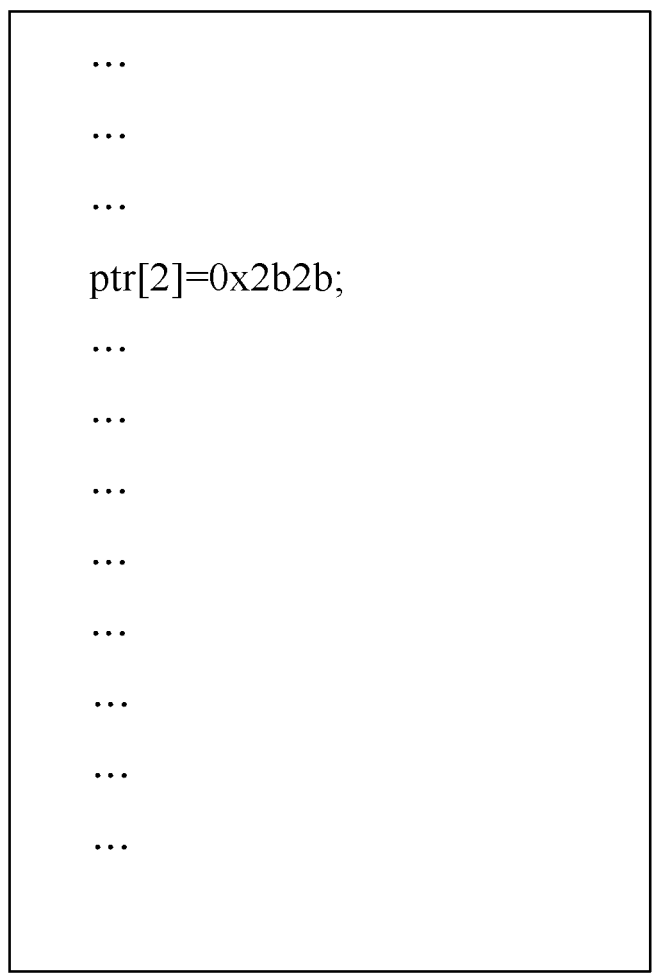

Next, as shown in FIG. 3F and FIG. 3G, when the execution circuit 11 processes a program code "ptr[2]=0x2b2b;" the execution unit 11 executes an access request (0x0d000000_81000008, 0x4) with respect to the address and size of the memory 9, and writes the value "0x2b2b" to the addresses 0x810000008 to 0x810009 of the memory 9. In the above, the memory base address corresponding to the access request (0x0d000000_81000008, 0x4) is 0x81000008, the corresponding address offset is 0x8100008-0x8100008=0x0, the tag is 0x0d, and the size parameter is 0x4.

To write the value "0x2b2b" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0d of the access request (0x0d000000_81000008, 0x4) is identical to the tag corresponding to the memory base address 0x81000008. In these embodiments, the tag corresponding to the memory base address 0x81000008 is 0x0d, and so the execution circuit 11 determines that the tag of the access request (0x0d000000_81000008, 0x4) is identical to the tag corresponding to the memory base address 0x81000008.

Moreover, the execution circuit 11 determines whether the part of the physical memory section to be accessed by the access request is located in a legal access address section corresponding to the memory base address. In some embodiments, because (0x4+0x0−1)%8 is equal to 0x3, the execution circuit 11 determines whether the part 0x81000008 to 0x81000009 of the physical memory section 0x81000008 to 0x8100000f to be accessed by the access request (0x0d000000_81000008, 0x4) is located in a legal access address section corresponding to the memory base address 0x81000008.

Accordingly, since the execution circuit 11 determines that: (1) the tag of the access request is equal to the tag corresponding to the memory base address; and (2) the part of the physical memory section matches the legal access section corresponding to the memory base address, the execution circuit 11 determines not to send an alert message (that is, not to issue an exception report), and write the value "0x2b2b" to the corresponding address.

Figure 3H:
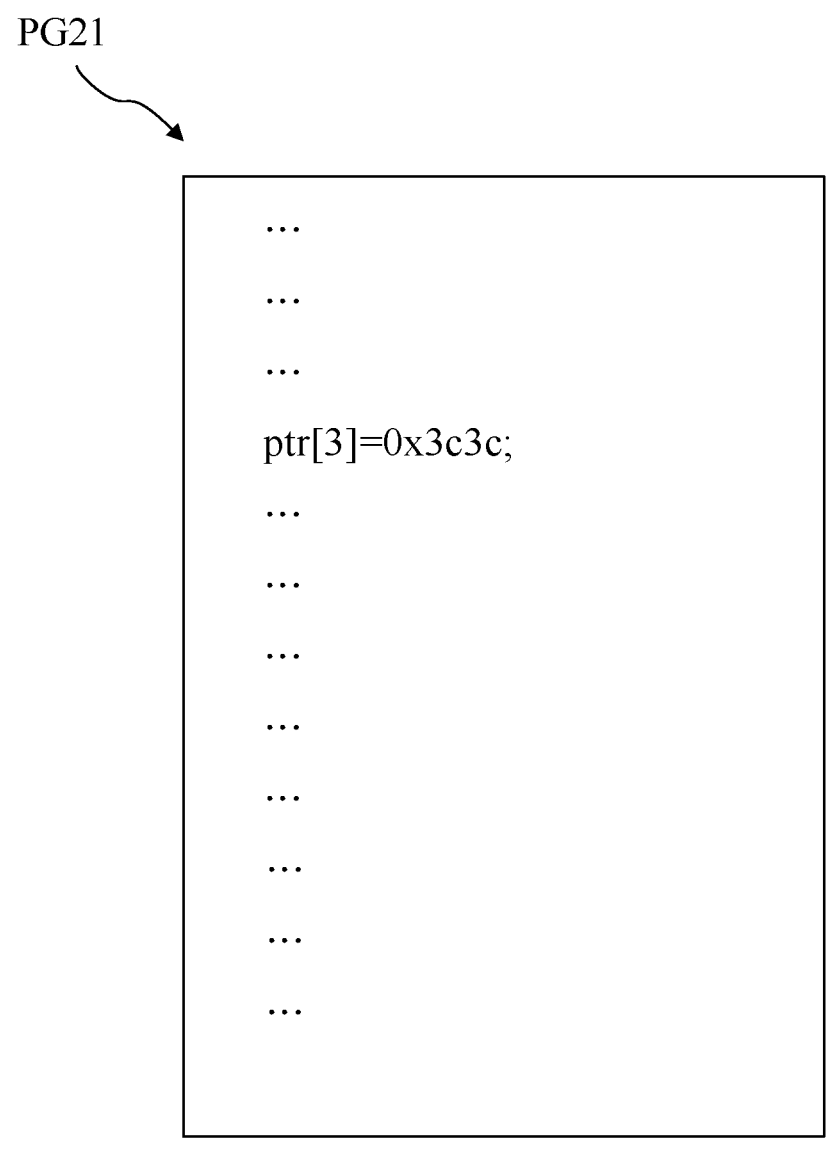

Next, as shown in FIG. 3H, when the execution circuit 11 processes a program code "ptr[3]=0x3c3c;", the execution unit 11 executes an access request (0x0d000000_8100000c, 0x4) with respect to the address and size of the memory 9, and writes the value "0x3c3c" to the addresses 0x8100000c to 0x8100000d of the memory 9. In the above, the memory base address corresponding to the access request (0x0d000000_8100000c, 0x4) is 0x81000008, the corresponding address offset is 0x8100000c-0x8100008=0x4, the tag is 0x0d, and the size parameter is 0x4.

To write the value "0x3c3c" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0d of the access request (0x0d00000_8100000c, 0x4) is identical to the tag corresponding to the memory base address 0x81000008. In these embodiments, the tag corresponding to the memory base address 0x81000008 is 0x0d, and so the execution circuit 11 determines that the tag of the access request (0x0d00000_8100000c, 0x4) is identical to the tag corresponding to the memory base address 0x81000008.

Moreover, the execution circuit 11 determines whether the part of the physical memory section to be accessed by the access request is located in a legal access address section corresponding to the memory base address. In some embodiments, because (0x4+0x4−1)%8 is greater than 0x3, the execution circuit 11 determines that the part 0x8100000c to 0x8100000d of the physical memory section 0x81000008 to 0x8100000f to be accessed by the access request (0x0d00000_8100000c, 0x4) is not located in a legal access address section corresponding to the memory base address 0x81000008.

Accordingly, since the execution circuit 11 determines that the part of the physical memory section does not match the legal access section corresponding to the memory base address, the execution circuit 11 determines to send an alert message (that is, to issue an exception report), and does not write the value "0x3c3c" to the corresponding address.

Figure 4A:
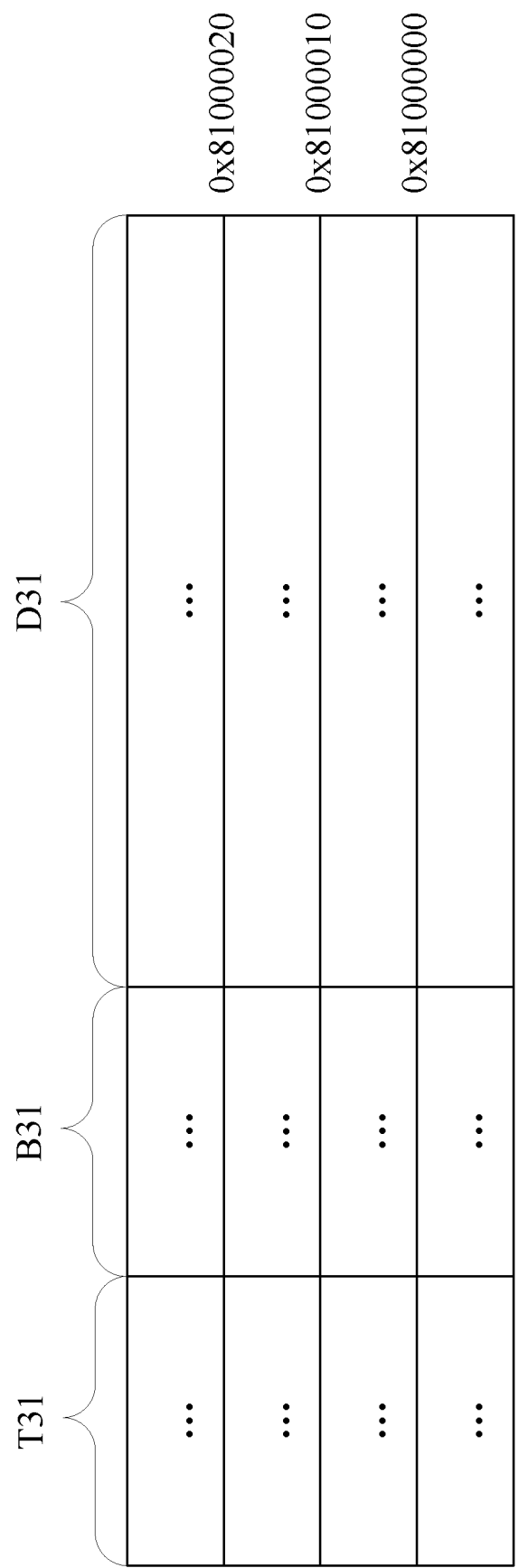

FIG. 4A to FIG. 4H show schematic diagrams of some examples of access detection of the present application. It should be noted that, in some embodiments, as shown in FIG. 4A, the memory 9 can be divided into three areas T31, B31 and D31, wherein T31 is for storing tag information, B31 is for storing legal access section information, and D31 is for storing data of physical memory sections. One data entry of the area D31 corresponds to one legal access section information entry of the area B31 and one tag entry of the area T31. When the size of each data entry of the area D31 is M bytes, the size of each legal access section information entry of the area B31 is M bits, and the size of each tag entry of the area T31 is N bits. For better understanding, in these embodiments, the size of each tag entry in the area T31 is 4 bits, the size of each data entry in the area D31 is 16 bytes, and the size of each legal access section information entry in the area B31 is 16 bits, where data is primarily expressed in a hexadecimal form. However, the above examples are not to be construed as limitations to the implementation forms of the present application.

Figure 4B:
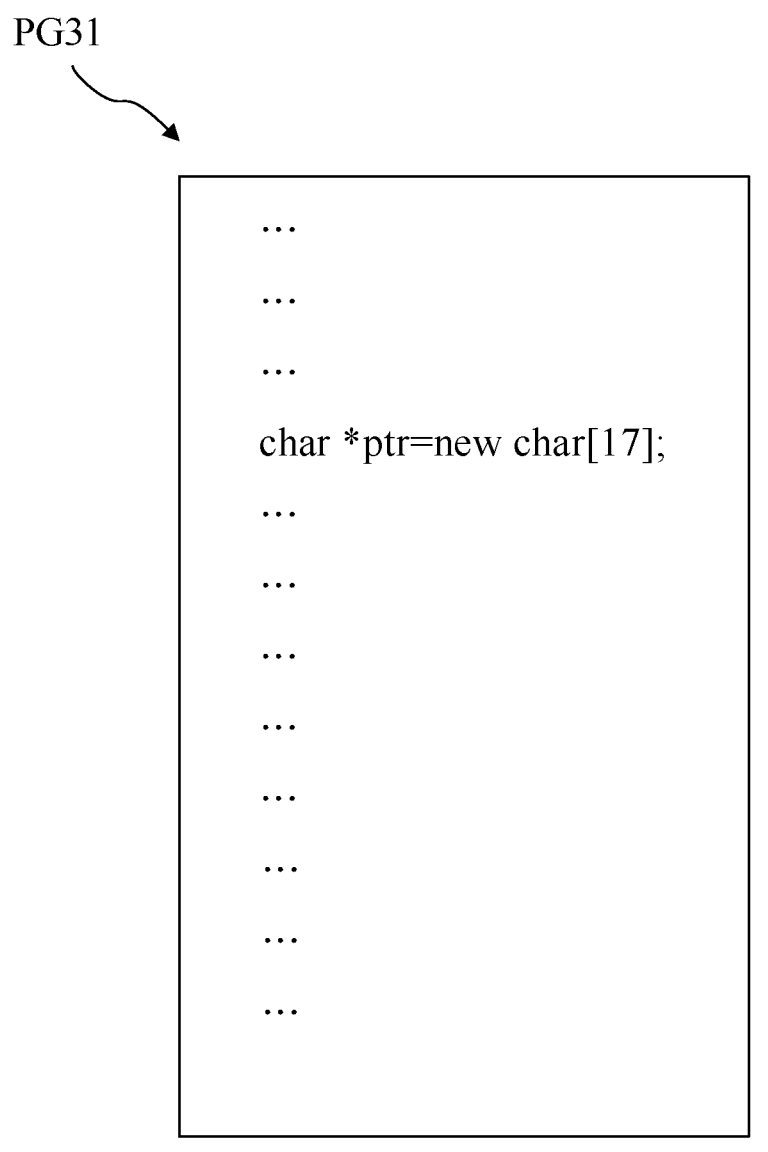

First of all, as shown in FIG. 4B and FIG. 4C, the execution unit 11 executes a program PG31. Upon processing a program code "char*ptr=new char[17];", the execution unit 11 executes a memory allocation instruction malloc (0x11), so as to allocate physical memory sections 0x810000000 to 0x8100000f corresponding to a memory base address 0x81000000 and physical memory sections 0x810000010 to 0x8100001f corresponding to a memory base address 0x810000010. Next, the execution unit 11: (1) determines a tag 0x0C corresponding to the memory base addresses 0x81000000 and 0x81000010; and (2) determines a legal access section corresponding to the memory base addresses 0x81000000 and 0x81000010 based on a size parameter 0x11 of the memory allocation instruction malloc (0x11). In these embodiments, the legal access section is a legal access bitmask, one legal access bitmask corresponds to one data entry, and one bit in the legal access bitmask represents the allocation status of one byte of the corresponding entry.

Further, the legal access section corresponding to the memory base address is determined as below: when a parameter of a memory allocation instruction allocates a part of a physical memory section, a value of a bit in a legal access bitmask corresponding to the part is determined to be 1; when a parameter of a memory allocation instruction does not allocate a part of the physical memory section, a value of a bit in a legal access bitmask corresponding to the part is determined to be 0. In these embodiments, since a total of 16 bytes of the physical memory section 0x81000000 to 0x8100000f corresponding to the memory base address 0x81000000 are all allocated by the memory allocation instruction, the corresponding legal access bitmask is 1111111111111111 in binary and 0xffff in hexadecimal. Moreover, since merely 1 byte of the physical memory section 0x81000010 to 0x8100001f corresponding to the memory base address 0x81000010 is allocated by the memory allocation instruction, the legal access bitmask is 0000000000000001 in binary and 0x1 in hexadecimal.

Figure 4D:
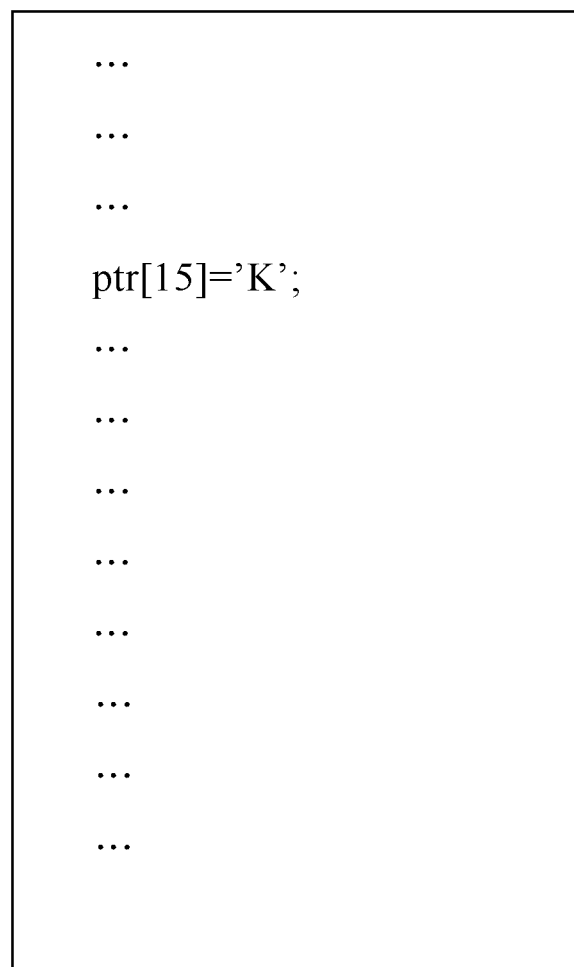

Next, as shown in FIG. 4D and FIG. 4E, when the execution circuit 11 processes a program code "ptr[15]='K';" the execution circuit 11 executes an access request (0x0c000000_8100000f, 0x1), and writes the value "K" (the hexadecimal value corresponding to "K" of the ASCII code is 0x4b) to the address 0x8100000f of the memory 9. In the above, the memory base address corresponding to the access request (0x0c000000_8100000f, 0x1) is 0x81000000, the corresponding address offset is 0x8100000f-0x81000000=0xf, the tag is 0x0c, and the size is 0x1.

To write the value "K" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0c of the access request (0x0c000000_8100000f, 0x1) is identical to the tag corresponding to the memory base address 0x81000000. In these embodiments, the tag corresponding to the memory base address 0x81000000 is 0x0c, and so the execution circuit 11 determines that the tag of the access request (0x0c000000_8100000f, 0x1) is identical to the tag corresponding to the memory base address 0x81000000.

Moreover, the execution circuit 11 determines whether the bit in the legal access bitmask corresponding to the part of the physical memory section to be accessed by the access request is a legal value. Further, the above determination step is primarily: when a bitwise AND operation (that is, the logic operation AND) of the value of shifting (offset+size) by 1 bit to the left and then subtracted by 1 and the negated value (that is, a value after the logic operation NOT) of the legal access bitmask is equal to zero, the bit in the legal access bitmask corresponding to the part of the physical memory section is a legal value; when the bitwise AND operation of the value of shifting (offset+size) by 1 bit to the left and then subtracted by 1 and the negated value of the legal access bitmask is not equal to zero, the bit in the legal access bitmask corresponding to the part of the physical memory section is a not legal value. In the above, "offset" represents an address offset, and "size2" represents a size parameter of the access request.

In these embodiments, since ((1<<(0xf+1))−1)& to 0xffff are equal to 0, the execution circuit 11 determines that the bit in the legal access bitmap corresponding to part 0x8100000f of the physical memory section 0x81000000 to 0x8100000f to be accessed by the access request (0x0c000000_8100000f, 0x1) is a legal value.

Accordingly, since the execution circuit 11 determines that: (1) the tag of the access request is equal to the tag corresponding to the memory base address; and (2) the part of the physical memory section matches the legal access section corresponding to the memory base address, the execution circuit 11 determines not to send an alert message (that is, not to issue an exception report), and write the value "K" to the corresponding address.

Figure 4F:
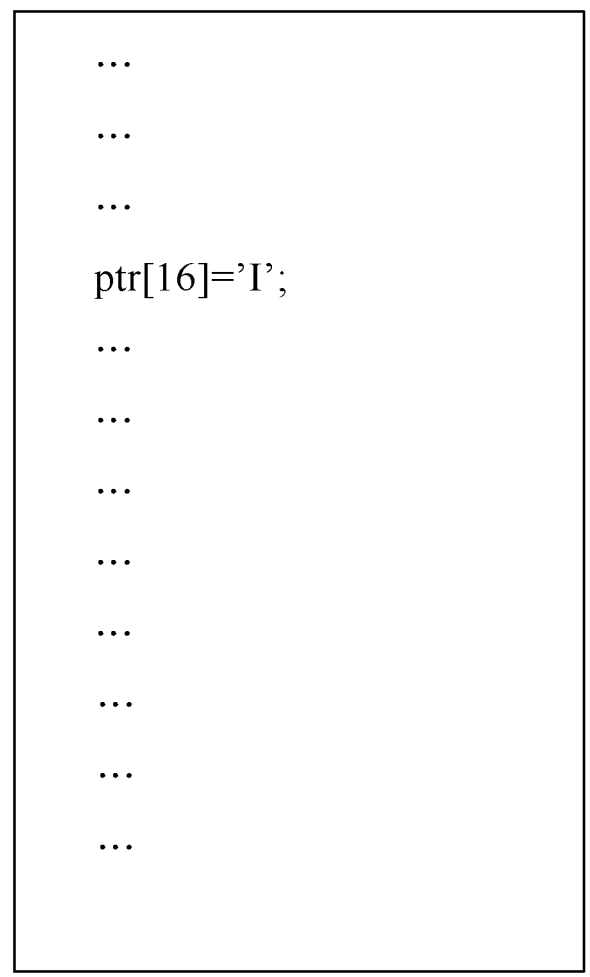

Next, as shown in FIG. 4F and FIG. 4G, when the execution circuit 11 processes a program code "ptr[16]='I'" the execution circuit 11 executes an access request (0x0c000000_81000010, 0x1) with respect to the address and size of the memory 9, and writes the value "1" (the hexadecimal value corresponding to "1" of the ASCII code is 0x49) to the address 0x810000010 of the memory 9. In the above, the memory base address corresponding to the access request (0x0c000000_81000010, 0x1) is 0x81000010, the corresponding address offset is 0x81000010-0x8100010=0x0, the tag is 0x0c, and the size parameter is 0x1.

To write the value "1" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0c of the access request (0x0c000000_81000010, 0x1) is identical to the tag corresponding to the memory base address 0x81000010. In these embodiments, the tag corresponding to the memory base address 0x81000010 is 0x0c, and so the execution circuit 11 determines that the tag of the access request (0x0c000010_81000010, 0x1) is identical to the tag corresponding to the memory base address 0x81000010.

Moreover, the execution circuit 11 determines whether the bit in the legal access bitmap corresponding to the part of the physical memory section to be accessed by the access request is a legal value. In these embodiments, since ((1<< (0x0+1))−1)& to 0x1 are equal to 0, the execution circuit 11 determines that the bit in the legal access bitmap corresponding to part 0x81000010 of the physical memory section 0x81000010 to 0x8100001f to be accessed by the access request (0x0c000000_81000010, 0x1) is a legal value Accordingly, since the execution circuit 11 determines that: (1) the tag of the access request is equal to the tag corresponding to the memory base address; and (2) the part of the physical memory section matches the legal access section corresponding to the memory base address, the execution circuit 11 determines not to send an alert message (that is, not to issue an exception report), and write the value "1" to the corresponding address.

Figure 4H:
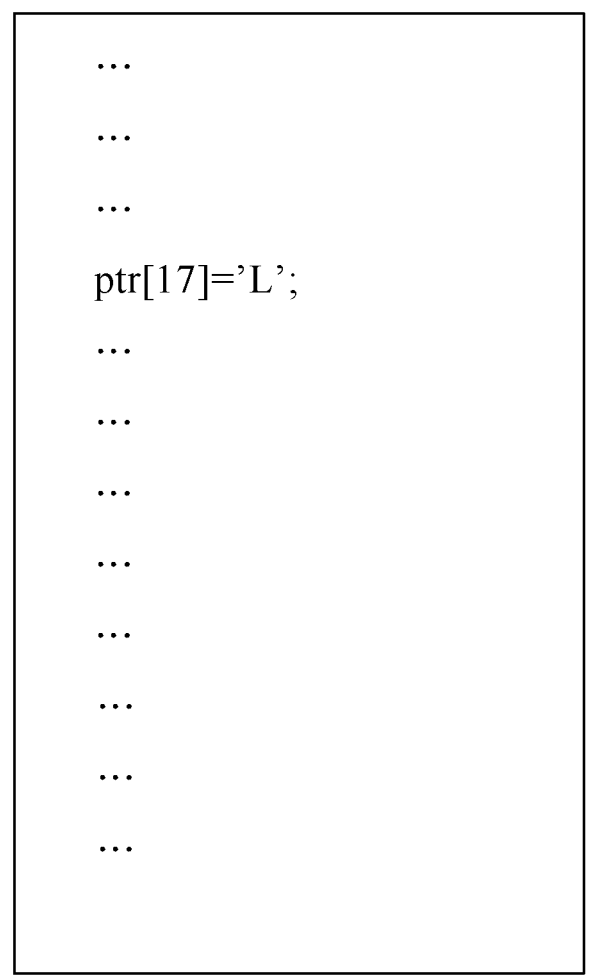

Next, as shown in FIG. 4H, when the execution circuit 11 processes a program code "ptr[17]='L';" the execution circuit 11 executes an access request (0x0c000000_81000011, 0x1) with respect to the address and size of the memory 9, and writes the value "L" (the hexadecimal value corresponding to "L" of the ASCII code is 0x4c) to the address 0x810000011 of the memory 9. In the above, the memory base address corresponding to the access request (0x0c000000_81000011, 0x1) is 0x81000010, the corresponding address offset is 0x81000011-0x8100010=0x1, the tag is 0x0c, and the size parameter is 0x1.

To write the value "L" to the corresponding address in practice, the execution circuit 11 first detects whether this write operation is legal; that is, determining (1) whether a tag of the access request is equal to a tag corresponding to the memory base address; and (2) whether the part of the physical memory section matches a legal access section corresponding to the memory base address. More specifically, the execution circuit 11 determines whether the tag 0x0c of the access request (0x0c000000_81000011, 0x1) is identical to the tag corresponding to the memory base address 0x81000010. In these embodiments, the tag corresponding to the memory base address 0x81000010 is 0x0c, and so the execution circuit 11 determines that the tag of the access request (0x0c000010_81000011, 0x1) is identical to the tag corresponding to the memory base address 0x81000010.

Moreover, the execution circuit 11 determines whether the bit in the legal access bitmap corresponding to the part of the physical memory section to be accessed by the access request is a legal value. In these embodiments, since ((1<< (0x1+1))−1)& to 0x1 are equal to 0, the execution circuit 11 determines that the bit in the legal access bitmap corresponding to part 0x81000011 of the physical memory section 0x81000010 to 0x8100001f to be accessed by the access request (0x0c000000_81000011, 0x1) is a legal value.

Accordingly, since the execution circuit 11 determines that the part of the physical memory section does not match the legal access section corresponding to the memory base address, the execution circuit 11 determines to send an alert message (that is, to issue an exception report), and does not write the value "L" to the corresponding address.

Figure 5:
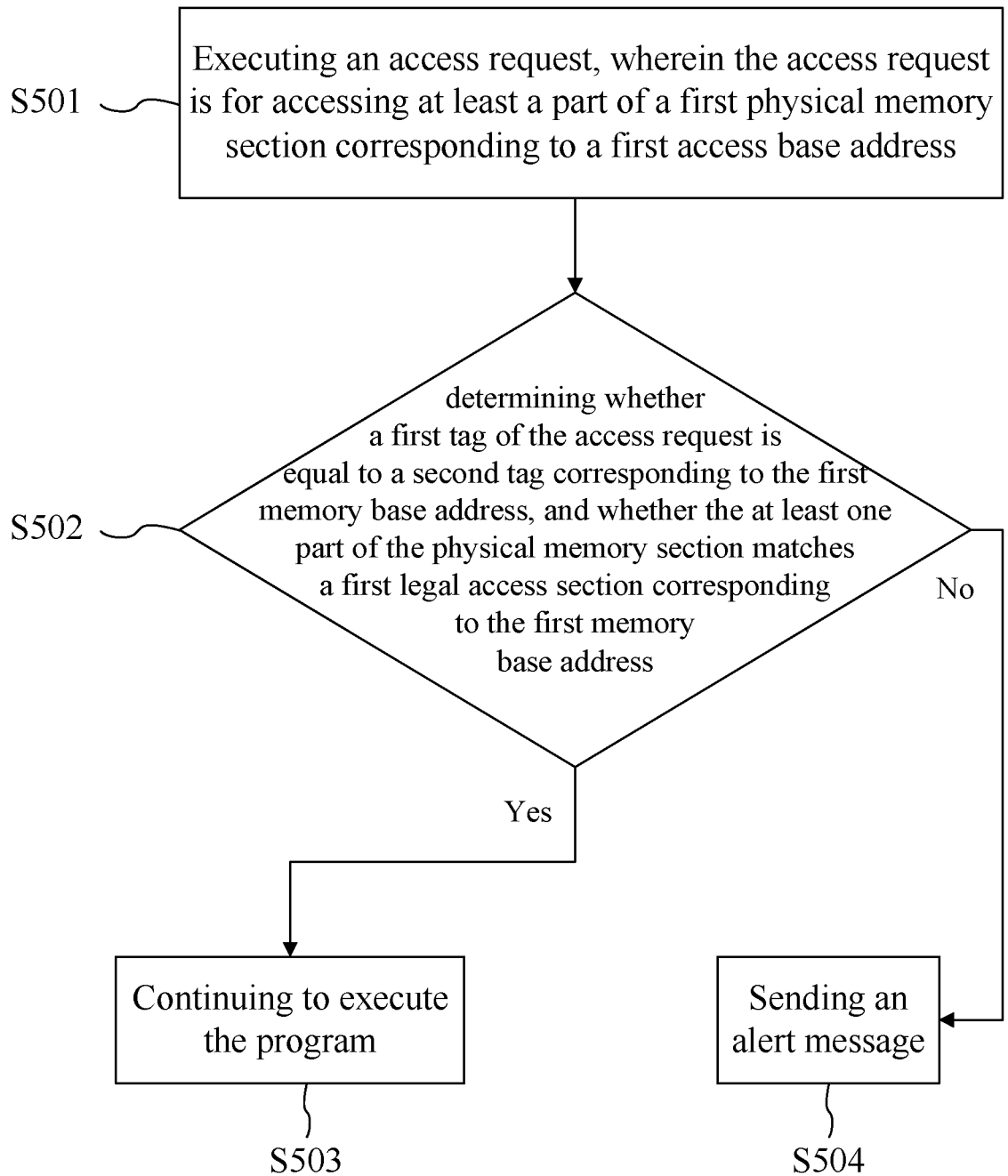
FIG. 5 is a flowchart of an access detection method according to an embodiment.

Some embodiments of the present application include a data operation method for a processor, of which a flowchart is as shown in FIG. 5. The data operation method of these embodiments is implemented by a processing (for example, the processing in the above embodiment), with the details of the steps of the method as described below. First of all, step S501 is performed to execute an access request, wherein the access request is for accessing at least a part of a first physical memory section corresponding to a first access base address. Step S502 is performed to determine whether a first tag of the access request is equal to a second tag corresponding to the first memory base address, and whether the at least one part of the physical memory section matches a first legal access section corresponding to the first memory base address, so as to obtain a determination result.

When it is determined that the first tag of the access request is equal to the second tag corresponding to the first memory base address, and the at least one part of the first physical memory section matches the first legal access section corresponding to the first memory base address, step S503 is performed, in which an alert message is not sent out, to continue to execute the program. When it is determined that the first tag of the access request is not equal to the second tag corresponding to the first memory base address, or the at least one part of the first physical memory section does not match the first legal access section corresponding to the first memory base address, step S504 is performed to send an alert message (that is, an exception report).

In some embodiments, the first legal access section includes a legal access address section, and the step of determining whether the at least one part of the first physical memory section matches the first legal access section further includes determining whether the at least one part of the physical memory section is located in the legal access address section. More specifically, an address offset is first determined based on the access request; when (offset+size−1)% M is less than or equal to B, it is determined that the at least one part of the physical memory section is located in the legal access address section; when (offset+size−1)% M is greater than B, it is determined that the at least one part of the physical memory section is not located in the legal access address section, wherein "offset" represents the address offset, "size" represents a size parameter of the access request, "M" represents a data entry size of the first physical memory section, and "B" represents a value of the legal access address section.

In some embodiments, the first legal access section includes a legal access bitmap, and the step of determining whether the at least one part of the first physical memory section matches the first legal access section further includes determining whether a bit in the legal access bitmap corresponding to at least one part of the physical memory section is a legal value. More specifically, the address offset can be first determined based on the access request; when the bitwise AND operation of the value of shifting (offset+size) by 1 bit to the left and then subtracted by 1 and the negated value of the legal access bitmap is equal to zero, the bit in the legal access bitmap corresponding to the at least one part of the physical memory section is a legal value; when the bitwise AND operation of the value of shifting (offset+size) by 1 bit to the left and then subtracted by 1 and the negated value of the legal access bitmap is not equal to zero, the bit in the legal access bitmap corresponding to the at least one part of the physical memory section is a not legal value, wherein "offset" represents the address offset and "size" represents a size parameter of the access request.

Figure 6:
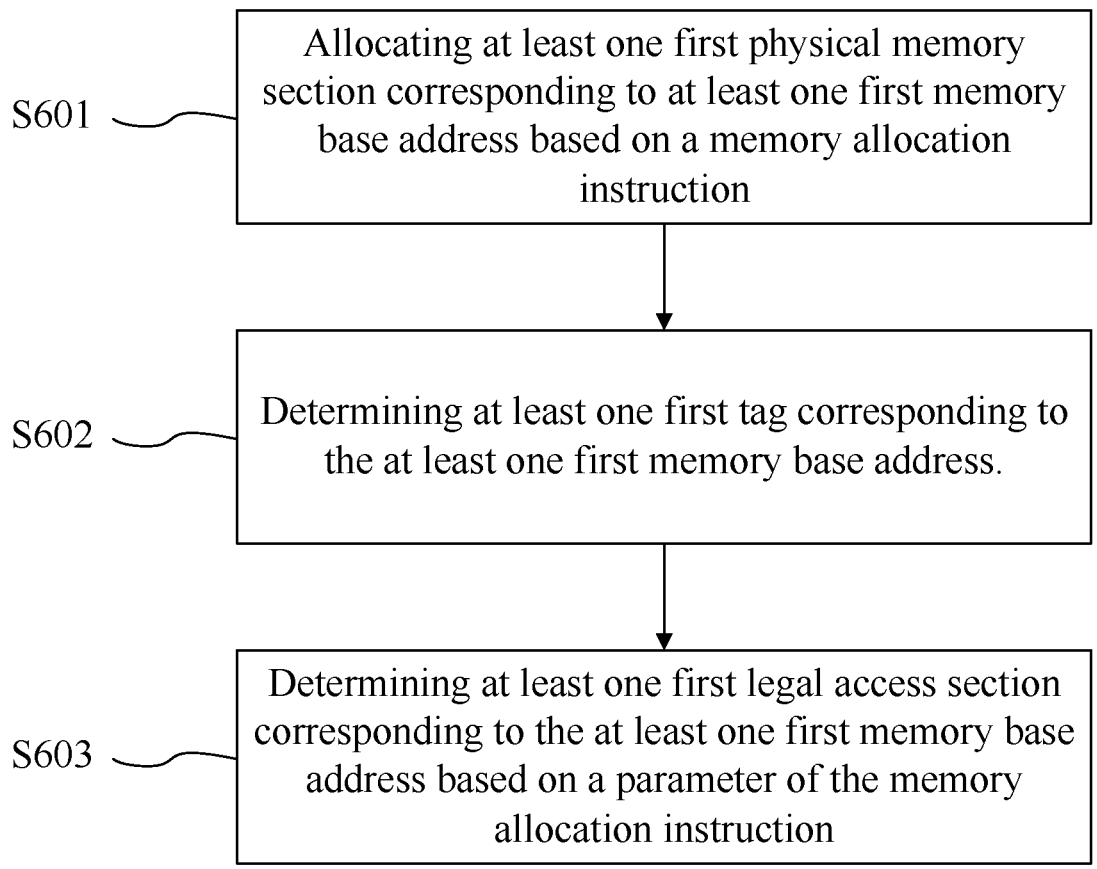
FIG. 6 is a flowchart of an access detection method according to an embodiment.

Some embodiments of the present application include a data operation method for a processor, of which a flowchart is as shown in FIG. 6. The data operation method of these embodiments is implemented by a processing (for example, the processing in the above embodiment), with the details of the steps of the method as described below. First of all, step S601 is performed to allocate at least one first physical memory section corresponding to at least one first memory base address based on a memory allocation instruction. Step S602 is performed to determine at least one first tag corresponding to the at least one first memory base address. Step S603 is performed to determine at least one first legal access section corresponding to the at least one first memory base address based on a parameter of the memory allocation instruction.

In some embodiments, the at least one first legal access section includes a legal access address section, the parameter of the memory allocation instruction includes a size parameter, and the step of determining the at least one first legal access section corresponding to the at least one first memory base address based on the size parameter of the memory allocation instruction further includes: when the size parameter of the memory allocation instruction is greater than M, determining that a value of a legal access address section of one of the at least one first legal access section is ((size % M)−1), and a value of a remaining legal access address section of the at least one first legal access section is (M−1); when the size parameter of the memory allocation instruction is less than or equal to M, determining that a value of a legal access address section of the at least one first legal access section is (size−1), wherein "size" represents the size parameter of the memory allocation instruction, and "M" represents a data entry size of one single of the at least one first physical memory section.

In some embodiments, the at least one first legal access section includes a legal access bitmap, and the step of determining the at least one first legal access section corresponding to the at least one first memory base address based on the parameter of the memory allocation instruction further includes: when the parameter of the memory allocation instruction allocates a part of the at least one first physical memory section, determining a value of a bit in the legal access bitmap corresponding to the part to be 1; when the parameter of the memory allocation instruction does not allocate the part of the at least one first physical memory section, determining a value of a bit in the legal access bitmap corresponding to the part to be 0.

With an additionally configured legal section, the processing unit and access detection method of the present application are capable of effectively detecting whether an access related instruction encounters any buffer overflow, and further determining whether to report related exception processing according to the result.

The features of some embodiments of the present application are described in brief for a person skilled in the art to more comprehensively understand various implementation forms of the disclosure of the present application. On the basis of the disclosure of the present application, it would have been easy for a person skilled in the art pertinent to the present application to design or modify other processes and structures, so as to achieve the same objects and/or the same advantages of the embodiments described herein. A person skilled in the art pertinent to the present application would have been able to understand that these equivalent implementation forms are to be encompassed within the spirit and scope of the disclosure of the present application, and various changes, substitution, replacements and alterations may be made without departing from the spirit and range of the disclosure of the present application.

What is claimed is:

1. An access detection method for a memory, comprising:
   executing an access request, wherein the access request is for accessing at least a part of a first physical memory section in the memory corresponding to a first access base address;
   determining whether a first tag of the access request is equal to a second tag corresponding to the first memory base address and whether the at least one part of the first physical memory section matches a first legal access section corresponding to the first memory base address;
   determining whether to send an alert message according to the determination result, wherein the alert message represents the access request encounters a buffer overflow;

writing a value of a program code based on the access request into the at least one part of the first physical memory section when determining not to send the alert message;

not writing the value of the program code into the at least one part of the first physical memory section when determining to send the alert message; and determining an address offset based on the access request, wherein the first legal access section comprises a legal access address section, and the step of determining whether the at least one part of the first physical memory section matches the first legal access section further comprises:

determining whether the at least one part of the first physical memory section is located in the legal access address section, wherein the step of determining whether the at least one part of the first physical memory section is located in the legal access address section further comprises:

when (offset+size−1) % M is less than or equal to B, determining that the at least one part of the first physical memory section is located in the legal access address section, and when (offset+size−1) % M is greater than B, determining that the at least one part of the first physical memory section is not located in the legal access address section, wherein, parameter offset represents the address offset, parameter size represents a size parameter of the access request, parameter M represents a data entry size of the first physical memory section, and parameter B represents a value of the legal access address section.

2. The access detection method according to claim 1, wherein when the determination result indicates that the first tag is not equal to the second tag or the at least one part of the first physical memory section does not match the first legal access section, determining to send the alert message; and when the determination result indicates that the first tag is equal to the second tag and the at least one part of the first physical memory section matches the first legal access section, determining not to send the alert message.

3. The access detection method according to claim 1, further comprising:

allocating at least one second physical memory section in the memory corresponding to at least one second memory base address based on a memory allocation instruction;

determining at least one third tag corresponding to the at least one second memory base address; and determining at least one second legal access section corresponding to the at least one second memory base address based on a size parameter of the memory allocation instruction.

4. The access detection method according to claim 1, wherein the data entry size of the first physical memory section is M bytes, and an entry size of the legal access address section is $\log_2 M$ bits.

5. The access detection method according to claim 1, wherein a first area of the memory is for storing data of the first physical memory section, a second area of the memory is for storing the second tag, and a third area of the memory is for storing the first legal access section.

6. A processing unit, comprising:
an execution circuit, electrically connecting to a memory, configured to execute the access detection method of claim 1.

7. An access detection method for a memory, comprising:
executing an access request, wherein the access request is for accessing at least a part of a first physical memory section in the memory corresponding to a first access base address;

determining whether a first tag of the access request is equal to a second tag corresponding to the first memory base address and whether the at least one part of the first physical memory section matches a first legal access section corresponding to the first memory base address;

determining whether to send an alert message according to the determination result, wherein the alert message represents the access request encounters a buffer overflow, writing a value of a program code based on the access request into the at least one part of the first physical memory section when determining not to send the alert message; and not writing the value of the program code into the at least one part of the first physical memory section when determining to send the alert message, wherein the first legal access section comprises a legal access bitmask, and the step of determining whether the at least one part of the first physical memory section matches the first legal access section further comprises:

determining whether a bit in the legal access bitmask corresponding to the at least one part of the first physical memory section is a legal value.

8. The access detection method according to claim 7, further comprising:

determining an address offset based on the access request;

wherein the step of determining whether the bit in the legal access bitmask corresponding to the at least one part of the first physical memory section is the legal value further comprises:

when a bitwise AND operation of a value of shifting (offset+size) by 1 bit to the left and then subtracted by 1 and a negated value of the legal access bitmask is equal to zero, determining that the bit in the legal access bitmask corresponding to the at least one part of the first physical memory section is a legal value;

when the bitwise AND operation of the value of shifting (offset+size) by 1 bit to the left and then subtracted by 1 and the negated value of the legal access bitmask is not equal to zero, determining that the bit in the legal access bitmask corresponding to the at least one part of the first physical memory section is not a legal value;

wherein parameter offset represents the address offset, and parameter size represents a size parameter of the access request.

9. The access detection method according to claim 7, wherein a data entry size of the first physical memory section is M bytes, and a size of the legal access bitmask is M bits.

10. The access detection method according to claim 7, wherein when the determination result indicates that the first tag is not equal to the second tag or the at least one part of the first physical memory section does not match the first legal access section, determining to send the alert message; and when the determination result indicates that the first tag is equal to the second tag and the at least one part of the first physical memory section matches the first legal access section, determining not to send the alert message.

11. The access detection method according to claim 7, further comprising:

allocating at least one second physical memory section in the memory corresponding to at least one second memory base address based on a memory allocation instruction;

determining at least one third tag corresponding to the at least one second memory base address; and determining at least one second legal access section corresponding to the at least one second memory base address based on a size parameter of the memory allocation instruction.

12. The access detection method according to claim 7, wherein a first area of the memory is for storing data of the first physical memory section, a second area of the memory is for storing the second tag, and a third area of the memory is for storing the first legal access section.

13. A processing unit, comprising:

an execution circuit, electrically connecting to a memory, configured to execute the access detection method of claim 7.

* * * * *